United States Patent [19]

Fagerstedt

[11] 4,391,455
[45] Jul. 5, 1983

[54] TRACTOR VEHICLE PROVIDED WITH A FIFTH-WHEEL PLATE

[75] Inventor: Nils Fagerstedt, Espoo, Finland

[73] Assignee: Oy Sisu-Auto Ab, Helsinki, Finland

[21] Appl. No.: 210,444

[22] Filed: Nov. 25, 1980

[30] Foreign Application Priority Data

Dec. 14, 1979 [FI] Finland .................................. 793931

[51] Int. Cl.³ ............................................. B62D 53/08
[52] U.S. Cl. ............................... 280/407; 280/425 R; 280/438 R; 280/DIG. 14
[58] Field of Search ........... 280/438 A, 425 R, 438 R, 280/407, 433, DIG. 14; 410/58, 61, 62, 56

[56] References Cited

U.S. PATENT DOCUMENTS

| | | | |
|---|---|---|---|
| 2,522,385 | 9/1950 | Lindsay | 280/425 R |
| 3,256,042 | 6/1966 | Hunsaker | 280/438 R X |
| 3,727,774 | 4/1973 | Wolfe, Jr. | 180/306 X |
| 3,858,730 | 1/1975 | Oswald et al. | 180/242 X |
| 4,111,273 | 9/1978 | Blackburn et al. | 280/425 R X |

FOREIGN PATENT DOCUMENTS

| | | | |
|---|---|---|---|
| 54-9826 | 1/1979 | Japan | 280/438 R |
| 1385739 | 2/1975 | United Kingdom | 280/438 R |

OTHER PUBLICATIONS

WO80/01560, International Application Published Under the PCT, (8-7-80), Sandquist (Inventor), 8 pp.

Primary Examiner—Joseph Paul Brust
Attorney, Agent, or Firm—Ladas & Parry

[57] ABSTRACT

Figure 4:
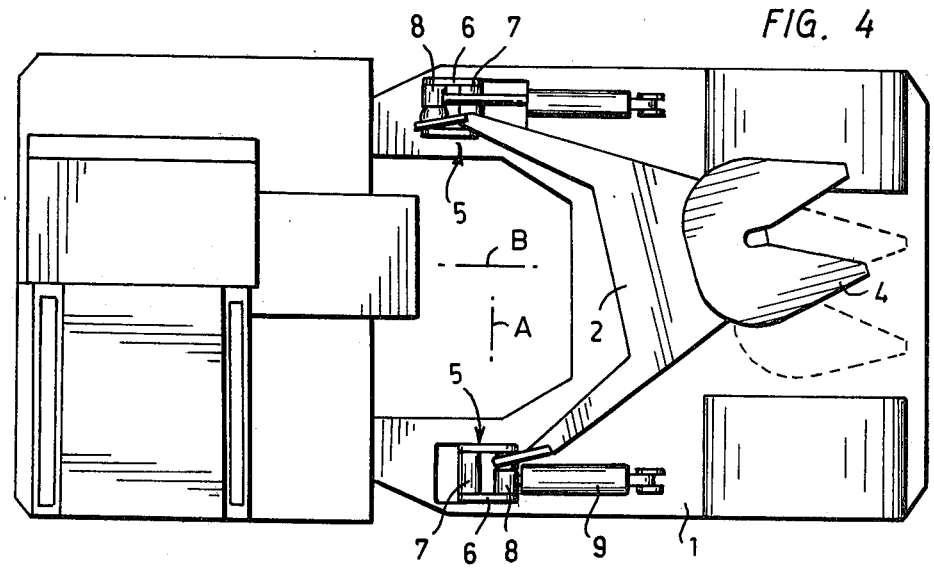

A tractor vehicle provided with a fifth-wheel plate (4) supported by a beam (3) mounted on the chassis of the vehicle vertically pivotably in the longitudinal direction of the vehicle on two fulcrums (5) spaced-apart in the transverse direction of the vehicle. The fulcrums of the beam are selectively together or separately displaceable in the longitudinal direction of said vehicle. In this way the fifth-wheel plate is displaceable not only in the longitudinal direction (A) of the chassis by displacing both fulcrums simultaneously but also in the transverse direction (B) of the chassis by displacing only one fulcrum (FIG. 4).

9 Claims, 4 Drawing Figures

TRACTOR VEHICLE PROVIDED WITH A FIFTH-WHEEL PLATE

The present invention relates to a tractor vehicle provided with a fifth-wheel plate, comprising a chassis, a beam mounted on said chassis vertically pivotably on two fulcrums spaced-apart in the transverse direction of said vehicle, and a fifth-wheel plate supported by said beam. Such a tractor vehicle is used, for example, in harbours for transporting semitrailers, ferry cars and similar vehicles.

It is previously known to mount a fifth-wheel plate on horizontal slide bars mounted in the upper end of a beam so that the fifth-wheel plate, by means of power-driven displacing means, is displaceable in the longitudinal direction of the vehicle closer to the centre of gravity of the vehicle. The aim is to displace in this way the point of support between the fifth-wheel plate and a load connected to the vehicle to a more advantageous position as far as the stability of the vehicle is concerned and at the same time to shorten the total length of the vehicle assembly. The beam is in this case mounted at its lower end on the chassis by means of two pivot shafts which are fixed in relation to the chassis.

However, a drawback in the fifth-wheel plate construction described above is that the displacing means to be arranged in the upper end of the beam require a certain space under the fifth-wheel plate, which necessitates the arrangement of a corresponding free space on the chassis in order to be able to turn down the beam and the fifth-wheel plate to a sufficient extent. In addition, pressure-medium tubes required by the displacing means must be provided underneath the fifth-wheel plate.

An object of the present invention is to provide a tractor vehicle provided with a fifth-wheel plate which eliminates the above-mentioned drawbacks and permits the displacement of the fifth-wheel plate in relation to the chassis in a more versatile manner. This object is achieved by means of a tractor vehicle according to the invention, which is characterized in that said fulcrums of said beam are jointly and separately displaceable in the longitudinal direction of said vehicle.

The invention is based on the idea that, by making the beam displaceable in relation to the chassis instead of making the fifth-wheel plate displaceable in relation to the beam, not only a possibility of longitudinally displacing the fifth-wheel plate is obtained but also a possibility of transversally displacing the fifth-wheel plate. At the lower end of the beam, considerably more space is available to mount on the chassis the most suitable means for the longitudinal displacement of the beam, and these means require no space under the fifth-wheel plate. Similarly, no pressure medium tubes need be provided along the beam.

By displacing both fulcrums of the beam simultaneously in the same direction, the fifth-wheel plate can be displaced in the longitudinal direction of the chassis, while displacement of only one of the fulcrums of the beam will displace the fifth-wheel plate in the transverse direction of the chassis. Owing to such a possibility of transverse displacement, the load can be laterally positioned more precisely in place, for example, when loading a ship in which connection the disposal of space is important. Similarly, it is possible to displace to load laterally, which facilitates backing with a vehicle because the driver has an unobstructed view backwards past the load. In addition, the stability of an articulated vehicle can be improved by means of lateral displacement of the load, for example, when driving in a curve, on ship's ramps, etc.

Figure 1:
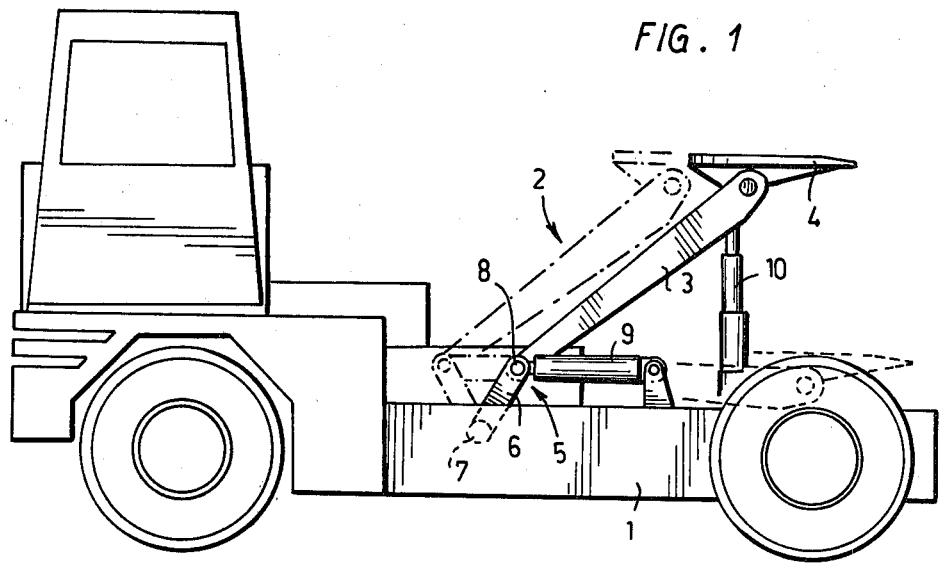
Figure 2:
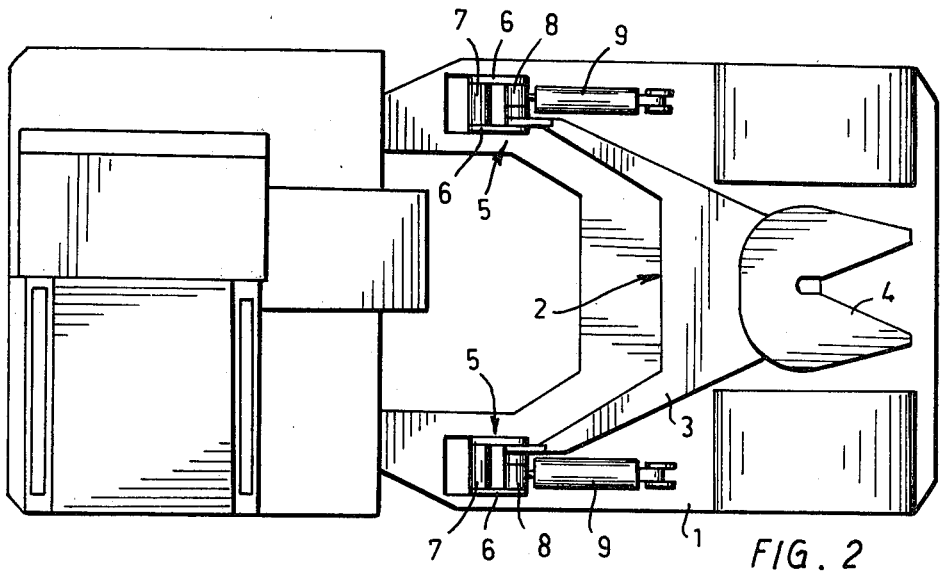
Figure 3:
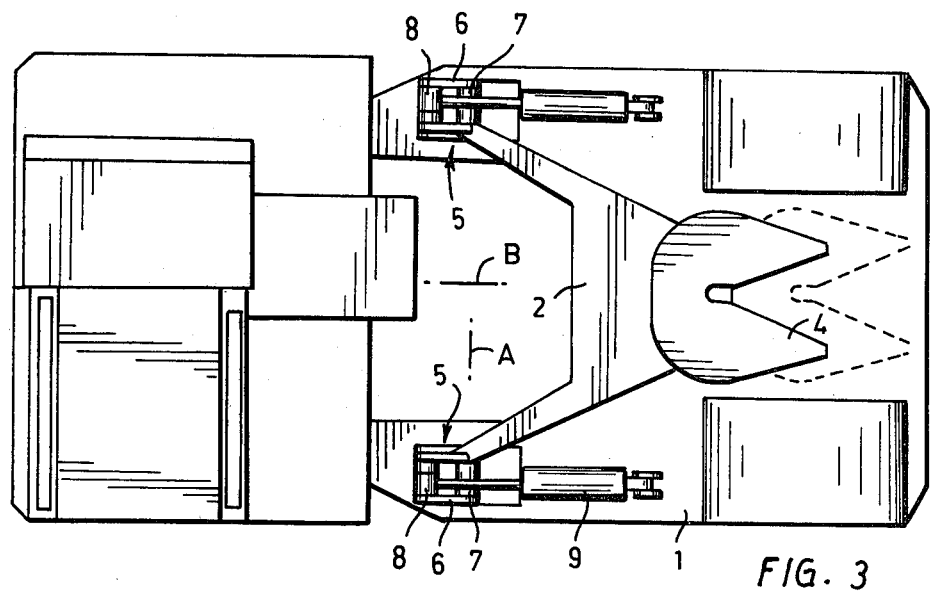

The invention will be described in more detail with reference to the accompanying drawings, in which FIGS. 1 and 2 are side and top views, respectively, of one preferred embodiment of a vehicle according to the invention, FIG. 3 is a top view of the vehicle after longitudinal displacement of the fifth-wheel plate, and FIG. 4 is a top view after transversal displacement of the fifth-wheel plate.

The tractor vehicle shown in the drawings comprises a chassis 1 which is movable on wheels. A fifth-wheel means 2 is mounted on the rear part of the chassis.

The fifth-wheel means comprises a lifting beam 3 on the upper end of which is articulately mounted a fifth-wheel plate 4 known per se. The beam is bifurcate in its lower part, each leg being mounted for support on the chassis in two fulcrums 5 spaced-apart in the transverse direction A of the chassis. Each fulcrum comprises a lever 6 which in its lower end is mounted on a transverse pivot pin 7 supported by the chassis and which in its upper end is likewise provided with a transverse pivot pin 8 on which the leg of the beam is pivotably journalled. The pivot pin 8 of the lever is connected with a hydraulic cylinder 9 which, in turn, is mounted on the chassis.

The fulcrum 5 of the second leg of the beam comprises the same parts, whereby the pivot pins 7 are located coaxially and the pivot pins 8 are also located coaxially in the embodiments shown in FIGS. 2 and 3. By operating the hydraulic cylinders the lever 6 can be pivoted in a vertical plane in the longitudinal direction B of the chassis between a retracted position shown in FIG. 2 and a protruding position shown in FIG. 3. For pivoting the beam in the vertical plane, a lifting cylinder 10 known per se is mounted between the beam and the chassis.

The tractor vehicle is backed in front of a semitrailer, ferry car or similar vehicle to be transported, while the beam 3 is lowered down into the position shown by broken lines in FIG. 1. When the fifth-wheel plate has been connected to the load to be hauled, the beam is by means of the lifting cylinder 10 raised into the position shown by solid lines in FIG. 1. Thereafter, the levers 6 are pivoted into the protruding positions shown in FIG. 3 so as to displace the fifth-wheel plate forwards to the raised position indicated by broken lines. This improves the stability of the vehicle because the support point between the plate and the load will in this way be displaced closer to the centre of gravity of the vehicle. It will be noted that plenty of space is available at the lower end of the beam for the displacing means required for displacing the fulcrums of the beam.

In order to facilitate the backing of the vehicle or in order to pack the load more tightly in the cargo space of a ship etc. or in order to improve the stability of the vehicle, the lever 6 or one fulcrum of the beam is turned into the retracted position by means of the corresponding hydraulic cylinder, whereby the fifth-wheel plate will be displaced in the transverse direction of the chassis into the position indicated by solid lines in FIG. 4. The mounting of the beam legs on the pivot shafts 8 has naturally been carried out so as to permit such a small angular movement of the beam in relation to the pivot pins.

The drawings and the related specification are only intended to illustrate the idea of the invention. In its details the tractor vehicle may vary considerably within the scope of the claims. This concerns especially the mounting of the beam on the chassis, which may be carried into effect in a number of different ways, for example, by means of slides, which are longitudinally displaceably mounted on the chassis and are displaced by means of hydraulic cylinders and which replace the levers described above. Alternatively, the legs of the beam may be journalled on a common pivot pin which in its ends is supported by bearings which are displaceable together or separately longitudinally of the vehicle. Instead of hydraulic cylinders, various mechanical displacing means may be contemplated.

What is claimed is:

1. A tractor vehicle provided with a fifth-wheel plate, comprising a chassis, a beam mounted on said chassis vertically pivotably on two fulcrums spaced-apart in the transverse direction of said vehicle, and a fifth-wheel plate supported by said beam, in which the improvement comprises said fulcrums of said beam being independently displaceable in the longitudinal direction of said vehicle.

2. A vehicle as claimed in claim 1, wherein each fulcrum comprises a movable pivot pin to which said beam is mounted each movable pivot pin extending in the transverse direction of said vehicle and being supported with respect to said chassis displaceably in the longitudinal direction of said vehicle.

3. A vehicle as claimed in claim 2, wherein said movable pivot pins are supported by levers pivotable about transverse fixed pivot pins supported by said chassis.

4. A vehicle as claimed in claim 3, wherein each lever is connected to a power means, said power means being supported by said chassis, said power means being for pivoting said levers on said fixed pivot pins in a vertical plane extending in the longitudinal direction of said vehicle.

5. A vehicle as claimed in claim 2, wherein said movable pivot pins are supported by slides displaceable in the longitudinal direction of the vehicle on guides supported by said chassis.

6. A vehicle as claimed in claim 5, wherein each slide is connected to said power means, said power means being for displacing said slide along said guides.

7. A vehicle as claimed in claim 4 or 6, wherein said power means is adapted to displace said fulcrums together or separately in the same direction or in opposite directions.

8. A vehicle as claimed in claim 2, wherein said movable pivot pins are coaxial in a retracted position and protruding position, of said levers.

9. A vehicle as claimed in claim 3, wherein said fixed pivot pins are coaxial.

* * * * *